United States Patent [19]

Miyagisima et al.

[11] Patent Number: 4,804,830

[45] Date of Patent: Feb. 14, 1989

[54] AUTOMATIC TRANSACTION APPARATUS

[75] Inventors: Takao Miyagisima; Kazuyuki Oohashi, both of Tokyo, Japan

[73] Assignee: Oki Electric Industry Co., Ltd., Tokyo, Japan

[21] Appl. No.: 881,055

[22] Filed: Jul. 1, 1986

[30] Foreign Application Priority Data

Jul. 5, 1985 [JP] Japan ................................ 60-147783

[51] Int. Cl.⁴ ......................... G06F 15/30; G06F 7/08

[52] U.S. Cl. ................................................ 235/379

[58] Field of Search ....................... 235/379, 380, 381; 340/365 P

[56] References Cited

U.S. PATENT DOCUMENTS

| | | | |
|---|---|---|---|
| 3,641,497 | 2/1972 | Constable . | |
| 3,657,521 | 4/1972 | Constable . | |
| 3,697,729 | 10/1972 | Edwards et al. . | |
| 3,761,682 | 9/1973 | Barnes et al. . | |
| 3,876,864 | 4/1975 | Clark et al. . | |
| 4,134,537 | 1/1979 | Glaser et al. . | |
| 4,313,109 | 1/1982 | Funk et al. | 340/365 P |
| 4,423,316 | 12/1983 | Sano et al. | 235/379 |
| 4,438,326 | 3/1984 | Uchida . | |

*Primary Examiner*—Roy N. Envall, Jr.
*Attorney, Agent, or Firm*—Wenderoth, Lind and Ponack

[57] ABSTRACT

An automatic transaction apparatus for processing transactions by the operation by a customer has a display unit, a through-vision touch type input device disposed on a screen of the display unit, and a judging device for judging a request of an operator for operation of the apparatus. The display unit, when operated by a customer, displays a text of designating customer's operation and an illustration thereof, and displays in a step where an operation to be selected or designated by the customer is needed, any item so selected and designated. The display unit, when the operator presents a request for operation by himself using a key, etc., displays a switch screen for setting functions of the automatic transaction apparatus or altering any of those functions or a screen of processing a fault as a screen use for operator operation. Even if the display unit has displayed a screen for customer operation and for operator operation, provided that there is included any item of selection or designation therein, a display position of said item is sensed by the input device by directly touching the position, and the item selected or designated can be thereby entered in the apparatus.

10 Claims, 21 Drawing Sheets

AUTOMATIC TRANSACTION APPARATUS

BACKGROUND OF THE INVENTION

1. Field of the Invention

The present invention relates to an automatic transaction apparatus provided in a bank, etc., or provided away from the bank for effecting a customer transactions such as drawing out a customer's money in cash, depositing his money, making an entry of an amount of a transaction to a bankbook, and transferring and changing savings.

2. Description of the Prior Art

An automatic transaction apparatus operated in banks, etc., is adapted to transact any business of a customers by the operation of the customer himself and to have a display unit disposed in the front of the apparatus for displaying text and illustrations for guiding the operation of the customer.

Such automatic bank transaction apparatuses, each including a display for displaying text and illustrations for guiding customer's operation, are disclosed for example in U.S. Pat. Nos. 3,641,497, 3,657,521, 3,697,729, 3,761,682, and 3,876,864. A display unit of these automatic bank transaction apparatuses is simply adapted to display the selection and designation of the kinds of transactions, text for guiding the customer's operation, an amount of money, and a notice to a customer, but are not adapted to display items corresponding to the positions of operating switches for use in the selection of the kinds of transactions by a customer, and text for compliments to a customer, requests for the next operation to the apparatus by a customer, and checks and designation on a transaction result by the apparatus.

U.S. Pat. No. 4,134,537 discloses a terminal unit with which a customer transacts business with a bank in a stepwise manner while observing instructions written on a display unit.

The terminal unit has a plurality of general-purpose operating switches provided adjacent to a screen of the display unit, and displays a text indicative of a function of the operating switch at each step of a transaction on the screen at a position corresponding to a location of the operating switch in each step of the transaction.

However, the terminal unit is not adapted to set any kind of transactions which the terminal unit can process during the observation of the display by an operator or to be informed of the contents of any fault when it is produced and of how to process the fault.

In addition, U.S. Pat. No. 4,438,326 describes another automatic transaction apparatus having a display unit fulfilling the same junction as that disclosed in U.S. Pat. No. 4,134,537.

The display unit of the automatic transaction apparatus displays not only a text of an instruction to guide the operation by a customer in each step of a transaction but also the cause of a trouble when it is produced as well as items needed to process the trouble for enabling the recovery of the apparatus.

However, the apparatus is also not adapted to freely set the kinds of transactions which can be processed by the apparatus in accordance with a display screen of the display unit. It is further adapted to have operating switches arranged adjacent to the display screen for use in selecting and designating items displayed on the display unit.

A prior art automatic transaction apparatus which is capable of freely setting the kinds of transactions which can be processed by the apparatus sets the processsing so as to start or stop the transactions by means of operating switches arranged on an internal operating board incorporated in the apparatus. The internal operating board is provided inside a housing of the apparatus so as not to be directly operatable externally. In operating the internal switches, a portion of the housing of the apparatus is opened by an operator using a key to permit the internal operating board to be operated. This complicates the setting of transactions to be processed as well as the operation needed to alter the transactions. Furthermore, in additionally giving a function to the automatic transaction apparatus to enable it to also process a transaction of another kind, the arrangement of the switches on the internal operating board, the number of display lamps, and the disposition of the lamps gets to be too complicated, and thus another internal operating board must be employed instead. This makes the operation needed to improve the functions of the automatic transaction apparatus complex as well as costly.

Furthermore, the prior art automatic transaction apparatus having operating switches disposed adjacent to the display screen for use in selecting and designating items displayed on the display unit is adapted to display an item selected or designated corresponding to each of the respective locations of the operating switches. This is done to inform an operator of which item is selected or designated when the operating switch is depressed.

However, such a display effected by positioning an item corresponding to a position of one of the operating switches is limited such that the display position of an item corresponds to the position of the operating switch, and the number of items being displayed is also limited to the number of operating switches, whereby many items being selected or designated are prevented from being displayed on one display screen. This results in an increased number of exclusive operated switches required to select or designate items, whereby a customer operating part of the automatic transaction apparatus gets to be more complicated and the operation of the apparatus by a customer is becomes more troublesome.

In addition, the automatic transaction apparatus disclosed in the above U.S. Pat. No. 4,438,326 is adapted to display the cause of any trouble using a code. Accordingly, an operator can not know the cause of the trouble and its position without decoding the displayed code.

SUMMARY OF THE INVENTION

In view of the drawbacks of the prior automatic transaction apparatus, it is an object of the present invention to facilitate the setting and alteration of functions of an automatic transaction apparatus.

Another object of the present invention is to reduce the erroneous operation upon setting and altering the functions described above.

Still another object of the present invention is to simply and rapidly inform an operator of a position of trouble being produced when the automatic transaction apparatus has trouble and of the processing needed to restore the apparatus from the trouble.

A still further object of the present invention is to increase a freedom of the automatic transaction apparatus equipped with a general-purpose operating switch having various functions in response to items displayed on a screen of a display unit without the number of the items and positions of display being limited to the configuration and number of operating switches.

A still another object of the present invention is to reduce mistaken operation in the automatic transaction apparatus while observing a display screen.

To achieve the above objects, an automatic transaction apparatus according to the present invention has a display unit for displaying procedures of operation of the apparatus by a customer as well as items selected or designated by the customer by making use of text and illustrations, a through-vision type touch input device disposed on the screen of the display unit for entering an item displayed at an arbitrary position on the screen by placing an operator's finger on the screen, a means for informing a customer of an operator's operation, a means for judging an operator's request for operation, a means for switching the operation of the display unit and the tough input device to an operator operating mode after judging the operator's request for the operation of the apparatus, a means for switching the operation of the display unit and the tough input device to a fault processing mode when there is no fault in the operator operating mode. The automatic transaction apparatus is adapted to display a fault position in the fault processing mode with an illustration while displaying the contents of the fault and a method to process it with a text, and furthermore displays a plurality of function items in the function designating mode and processes the displayed items in either the fault processing mode or the function designating mode by touching the displayed item on the screen directly with an operator's finger.

According to the present invention, the automatic transaction apparatus can be adapted, in case for example of partly putting a stop to transactions, to permit an operator to insert a key into a key slot of the apparatus for operating the switches, etc., or to permit an operator to insert a card into a card reader of the apparatus for reading the card and for thereby switching the apparatus to the operator operating mode and thus displaying a plurality of function items on a display unit for a customer and thereafter partly stopping transactions effected by the apparatus only by touching a position on a screen at which an item to instruct the partial stoppage of the transactions is displayed. In addition, the automatic transaction apparatus can be adapted when the operation thereof gets to be impossible due to a fault produced therein, to likewise permit an operator to switch the apparatus using his key or card to the operator operating mode for intelligibly displaying the fault position, the cause thereof, and how to process it on the display unit and to thereby support the operator serving to eliminate the cause of the fault and prompt the apparatus to be restored.

Moreover, according to the present invention, an operator can perform the setting of any function of the automatic transaction apparatus and change the function to another one of the apparatus as well as to perform processing to restore the apparatus from a fault state simply and accurately in a short time in the same manner as that of a customer's operation.

Furthermore, according to the present invention, a customer and an operator can inform the automatic transaction apparatus of their requests by directly touching the display screen of the apparatus, and thereby reduce probable mistaken operation, while the it can permit the automatic transaction apparatus to interrogate a customer or an operator on many and various requests using only a single display screen.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1A:
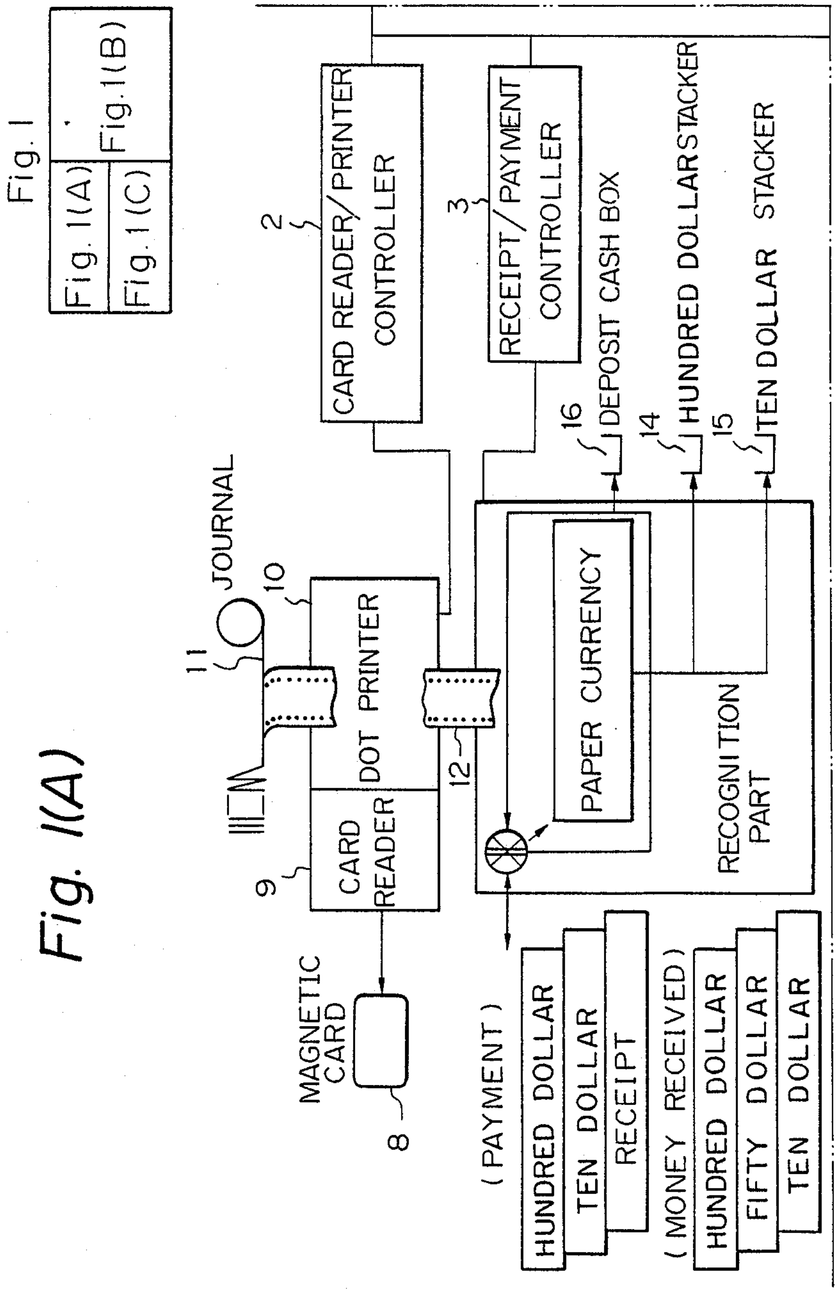
FIG. 1, consisting of FIGS. 1(A)–1(C), is a block diagram showing connections among respective elements constituting an embodiment of an automatic transaction apparatus according to the present invention.
Figure 1B:
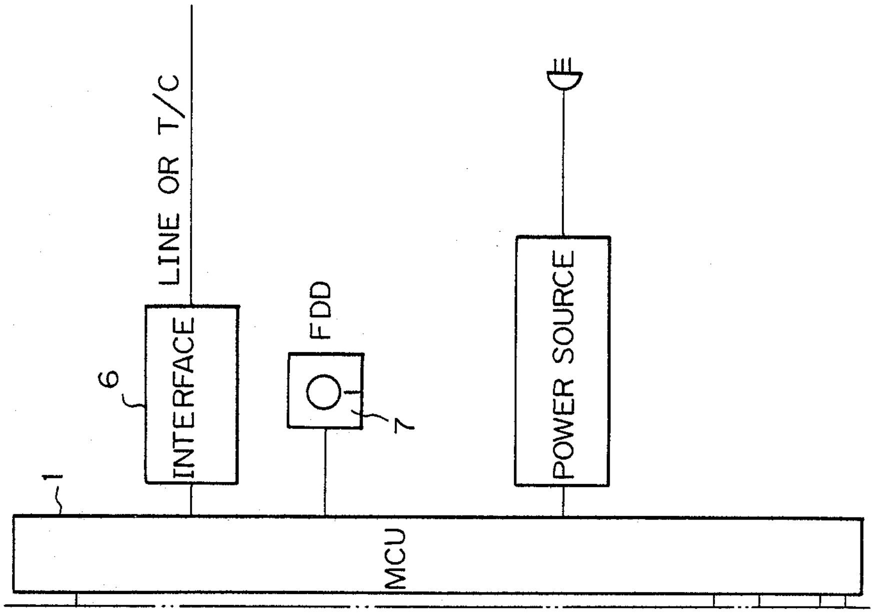
Figure 1C:
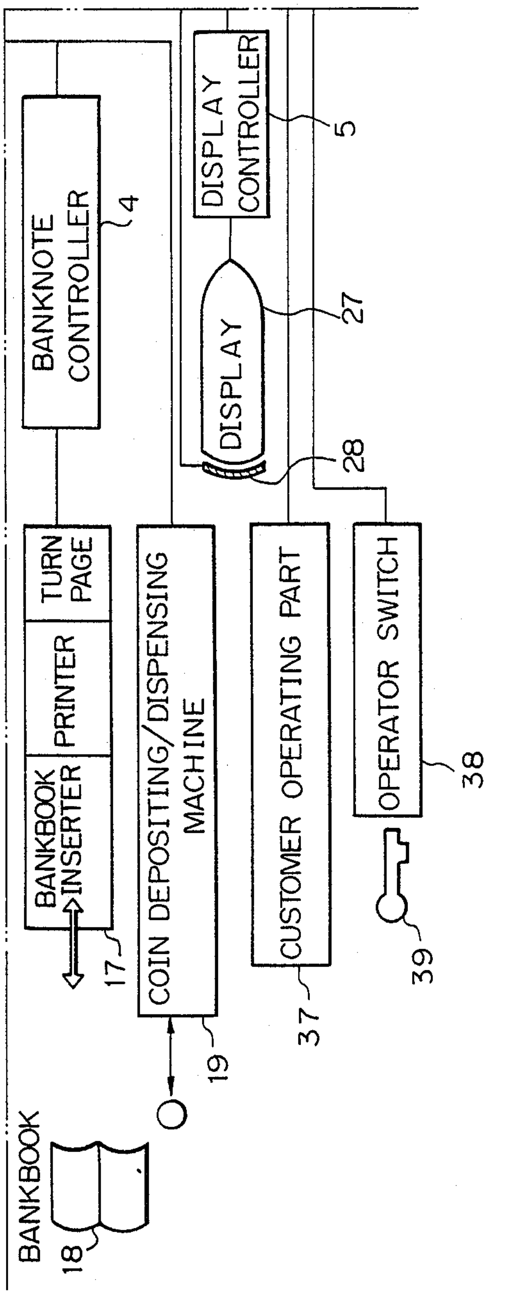

Let us now describe the arrangement of an embodiment of an automatic transaction apparatus according to the present invention with reference to FIG. 1.

In the figure, a main controller 1 is composed of a processor and a memory, etc., and is adapted to control the operation of the whole automatic transaction apparatus. Namely, the main controller 1 operates an input-/output part of the automatic transaction apparatus by executing a program previously stored in the memory via a card reader/printer controller 2, a receipt/payment controller 3, a banknote controller 4, and a display controller 5, etc., and is connected to a host computer of a business managing center of a bank, etc., via a communication interface 6 and through a communication line via a transmission line or a communication controller for transmitting/receiving transaction data and transaction control information. The main controller 1 is furthermore connected to an external memory 7 composed of a floppy disk, etc., for reading various kinds of programs required for transactions from the external memory 7 as well as transaction data, while writing transaction records and error records in the memory 7.

The card reader/printer controller 2 controls the operations of reading and writing by a card reader/writer 9 magnetic recording data stored on a magnetic stripe of a magnetic card 8 inserted by a customer as well as operations of printing transaction records on a journal paper 11 and a receipt 12 by a dot printer 10 and an imprinting operation of an embossing character on the magnetic card 8, and further controls the operation of transferring card read data, card write data, and printing data between the card reader/printer 9 and the dot printer 10, and the main controller 1.

The deposit/dispensation controller 3 controls the operation of a depositing/dispensing machine 13 for depositing and dispensing paper currency. The depositing/dispensing machine 13 has a depositing function to incorporate a note inserted by a customer into the automatic transaction apparatus, judges the denominations of money and tells whether the money is genuine or counterfeit for thereby receiving only paper currencies judged to be genuine, and housed notes reusable for dispensation thereamong into a hundred dollar stacker 14 and a ten dollar stacker 15 for each kind of money while housing notes other than the above notes in a deposit cashbox as well as a paper currency dispensing function to draw out notes of denominations of money designated by a customer from the hundred dollar stacker 14 and the ten dollar stacker 15, count them, and discharge them together with a receipt.

The bankbook controller 4 controls a bankbook registering machine 17 composed of a bankbook inserter unit, a printer unit, and a turn page unit. The bankbook registering machine 17 has functions: to read/write any data from/in a magnetic stripe provided on a bankbook 18 inserted by a customer; detect a page of the bankbook and a line already printed; print a record or transactions; and turn pages and start a new page when a blank for printing is filled.

A coin depositing/dispensing machine 19 judges the genuineness or spuriousness of a coin deposited by a customer and the value thereof, houses coins for each value thereof, and counts the number of coins of a value designated by a customer.

Figure 3:
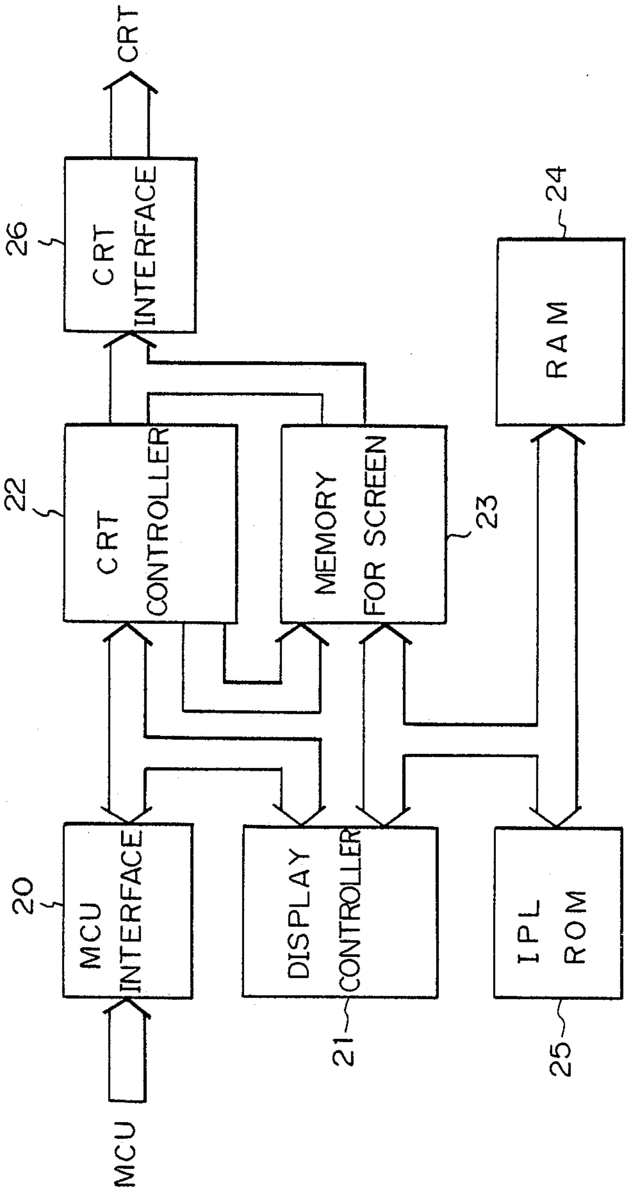
FIG. 3 is a block diagram showing the arrangement of a display controller of FIG. 1.

The display controller 5 has an interface 20 to the main controller 1 as shown in detail in FIG. 3, a display control main controller 21, a CRT controller 22 for a CRT employed as a display, a screen memory 23 for storing the present display screen data in the CRT, a RAM 24 for editing display screen data on the CRT and the next screen data, a ROM 25 for storing an initial program loading program, and a CRT interface 26 for interfacing with the CRT, and controls the display operation of a display using the CRT.

Figure 4:
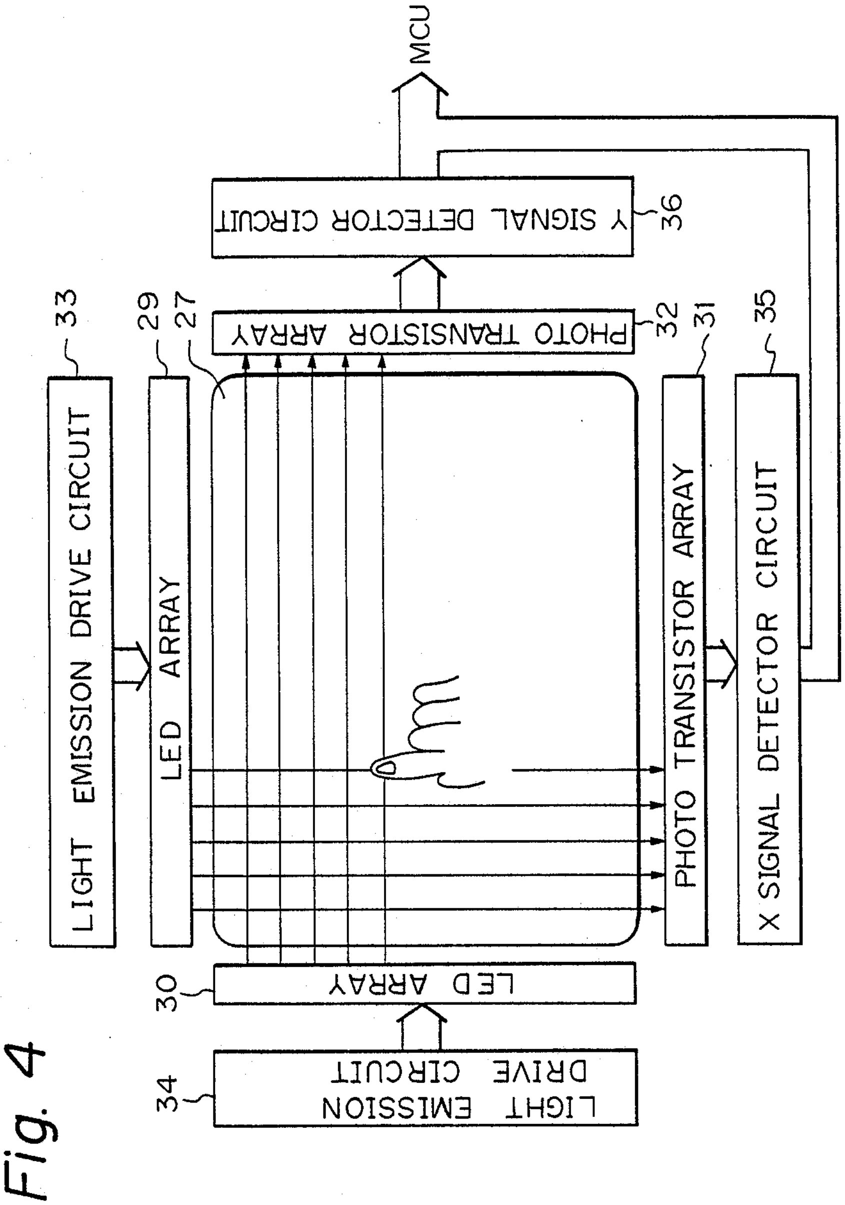
FIG. 4 is a view illustrating the arrangement of a transparent visible touch sensor of FIG. 1.

A through-vision type touch input device 28 is provided on the screen of the display 27 and enters positional information on a position touched by fingers, etc., into the main controller 1. The arrangement of the touch type input device 28 is as shown in FIG. 4. According to the present embodiment, for the touch type input device 28 an optical touch input device is employed, which device is adapted to arrange LED arrays 29 and 30 and photo transistor arrays 31 and 32 in a confronting relationship and successively drive LEDs arranged respectively in x and y directions for scanning them in x and y directions.

The LED arrays 29 and 30 emit infrared rays by operating emission driving circuits 33 and 34 using a signal issued from the main controller 1, and rays impinge upon the screen divided into a matrix of for example 16×16, the screen being adapted to have the photo transistor arrays 31 and 32. Any signal is generated by touching any item displayed on the screen of the display 27 with a finger so as to block the infrared rays passing through that touched portion, and detecting that portion by means of a x signal detector 35 and a y signal detector 36. Such a touch type input device is easily available from MINATO ELECTRONICS INC. in Japan as "TOUCH DATA". In addition, the same device is available from Magnavox Co. Ltd. in U.S.A. as a model 28 touch panel, which is applicable to the embodiment of the present invention.

Furthermore, although in the present embodiment an optical touch type input device has been employed, a matrix switch constructed by combining transparent electrodes longitudinally and laterally may be employed. This is available from Interaction Systems, Inc. in U.S.A. as "TK-100 SERIES Touch-Sensitive CRT Add-On Kit".

A customer operating part 37 is manually operated by a customer when he effects transactions and has a display for displaying the kinds of transactions processed by the automatic transaction apparatus and the state of the apparatus as well as a button for calling an operator.

An operator key switch 38 is switched on when a key 39, exclusively possessed by an operator, is inserted into the apparatus and turned for informing the main controller 1 of a request for the operator operating mode.

Figure 2:
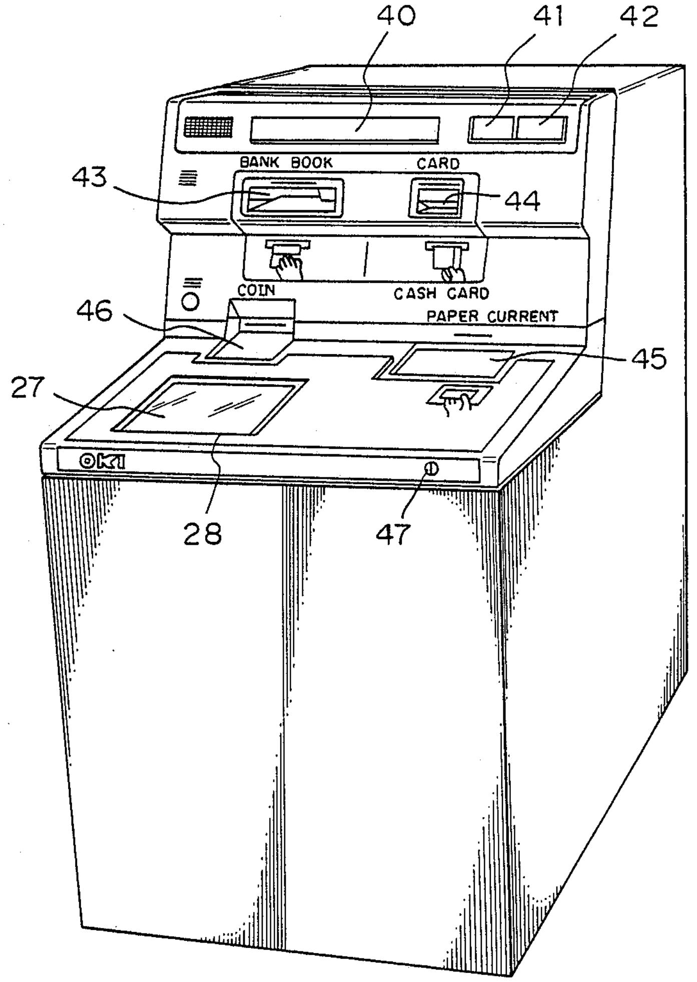
FIG. 2 is a front view of the apparatus of FIG. 1.

Let us here describe the appearance of the automatic transaction apparatus of the present invention with reference to FIG. 2. This is viewed from the side of a customer and adapted to exhibit a full view of the operator operating part 37. It includes on the uppermost portion thereof a transaction item display 40 for displaying items of transactions being processable, an operation display part 41 for displaying the apparatus when running, and an employment interruption display 42 for displaying the apparatus when it is interrupted, and has an inlet/output slot 43 for the bankbook 18 and an inlet/outlet slot 44 for the magnetic card 8. It furthermore has a paper currency depositing/dispensing slot 45 and a coin depositing/dispensing slot 46. The display 27 is arranged within the operating surface and forwardly protrudes and the screen directly fronts on the operating surface via transparent protective glass. Moreover, the LED arrays and the photodiodes are arranged circumferentially of the display screen together with the touch type input device 28. A key slot 47 into which the operator key 39 is inserted is provided on the front right side of the operating surface.

Figure 5:
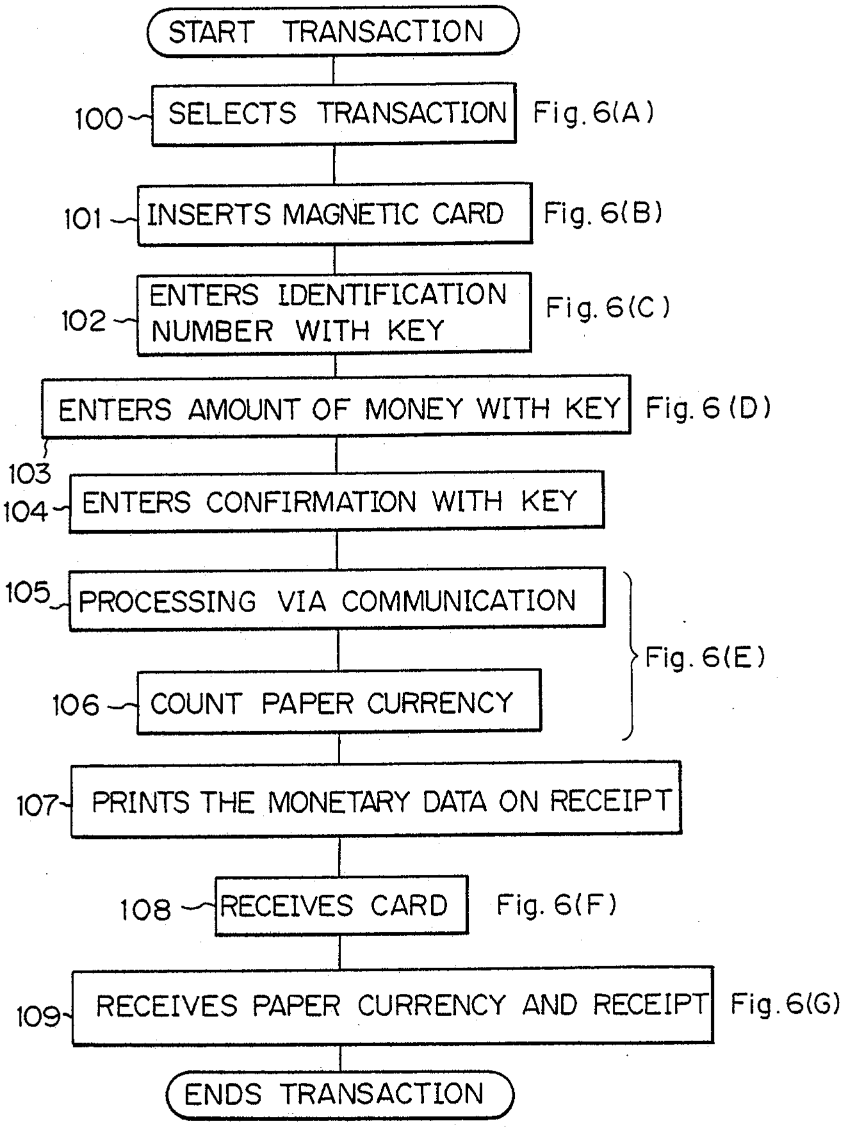
FIG. 5 is an illustrative flowchart showing a procedure to process transactions in the embodiment of the automatic transaction apparatus according to the present invention.
Figure 6A:
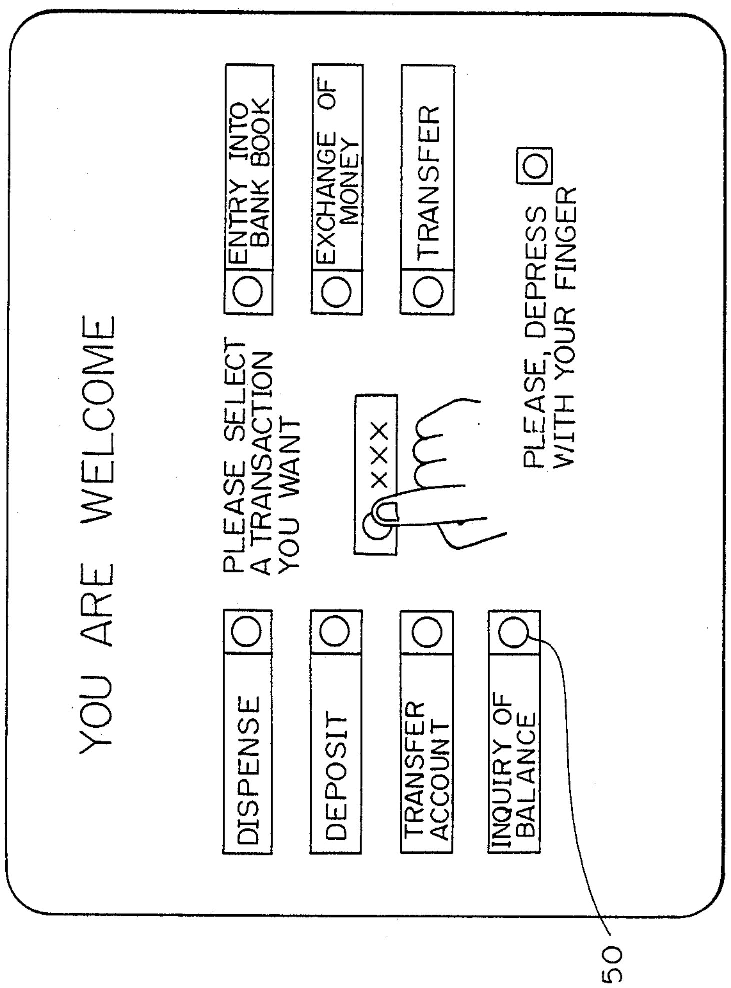
FIGS. 6(A) to (G) are illustrations showing each of a series of screens to designate a customer's operations in the embodiment of an automatic transaction apparatus according to the present invention.

Let us then describe an illustrative procedure of transactions by the automatic transaction apparatus described above with reference to FIG. 4. The apparatus displays a screen of selecting transactions on the display 27 as the apparatus is ready for operation and on an initial state of writing for a customer. The screen as illustrated in FIG. 6(A) exhibits transaction items of "Dispense", "Deposit", "Transfer Account", "Balance Inquiry", "Entry into Bankbook", "Exchange of Money", and "Transfer" together with button marks 50 on the right of the respective displays. A customer selects the desired transaction by depressing the button mark 50. The position depressed with a finger of the customer is entered by means of the touch input device 28, and x and y coordinates thereof are judged by the main controller 1. The main controller 1 has recognized the coordinates or respective items on the present display screen, and can be informed of which item is designated by knowing the coordinates being entered as described above. FIG. 5 is an illustration of selected dispense transaction in a step 100 where the desired transaction is selected.

Figure 6B:
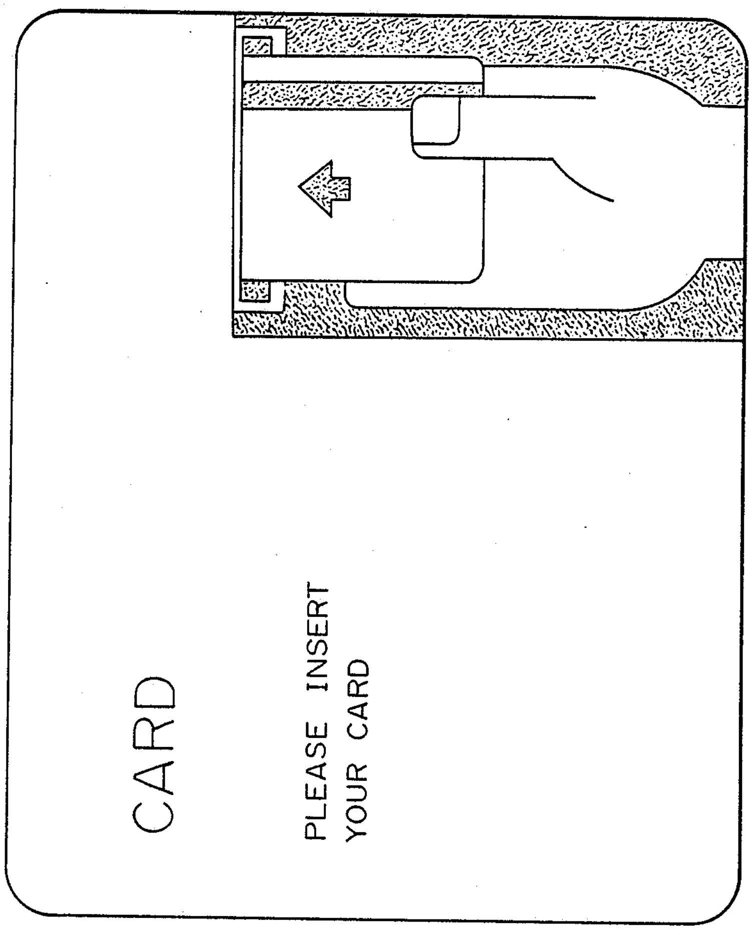

By depressing the button mark "Dispense" on the screen of FIG. 6(A), the main controller 1 knows that the dispense transaction has been selected by a customer, and thereby instructs the display controller 5 to display the next screen. The display controller 5 forces the display 27 to display a screen of a text and its illustration to instruct a card to be inserted as shown in FIG. 6(B). The customer, looking at this, inserts the magnetic card 8 into the card insertion slot 44 (Step 101). The card reader/writer 9 reads a magnetic stripe of the magnetic card 8, and transfers data read by the card reader/printer controller 2 to the main controller 1.

Figure 6C:
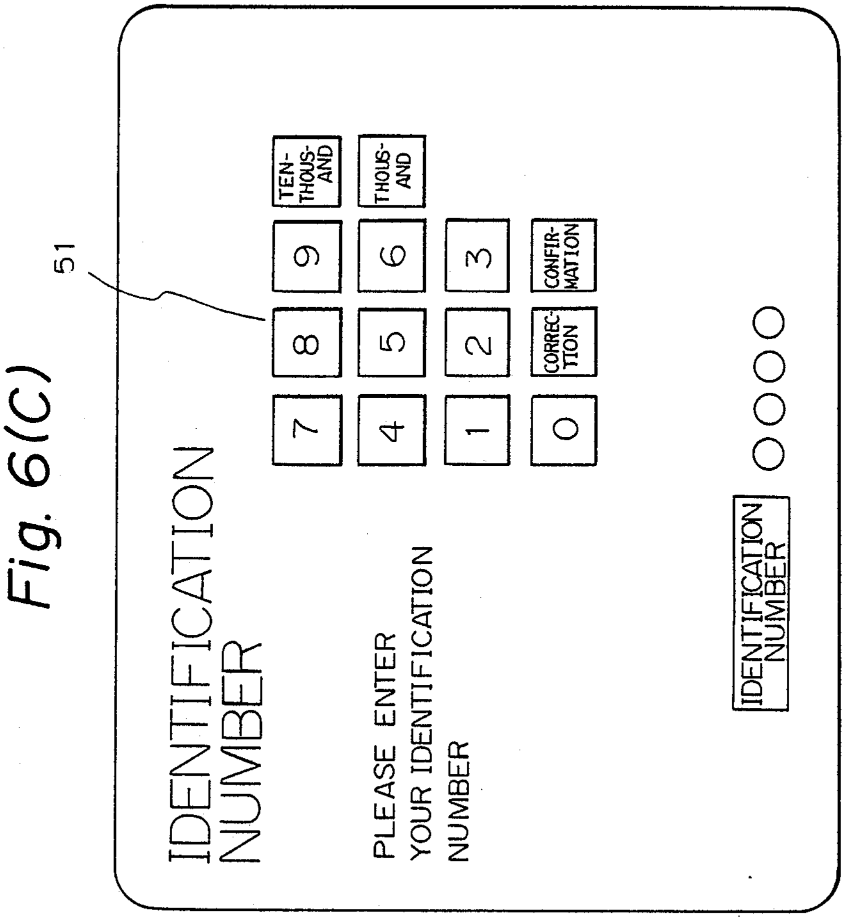
Figure 6D:
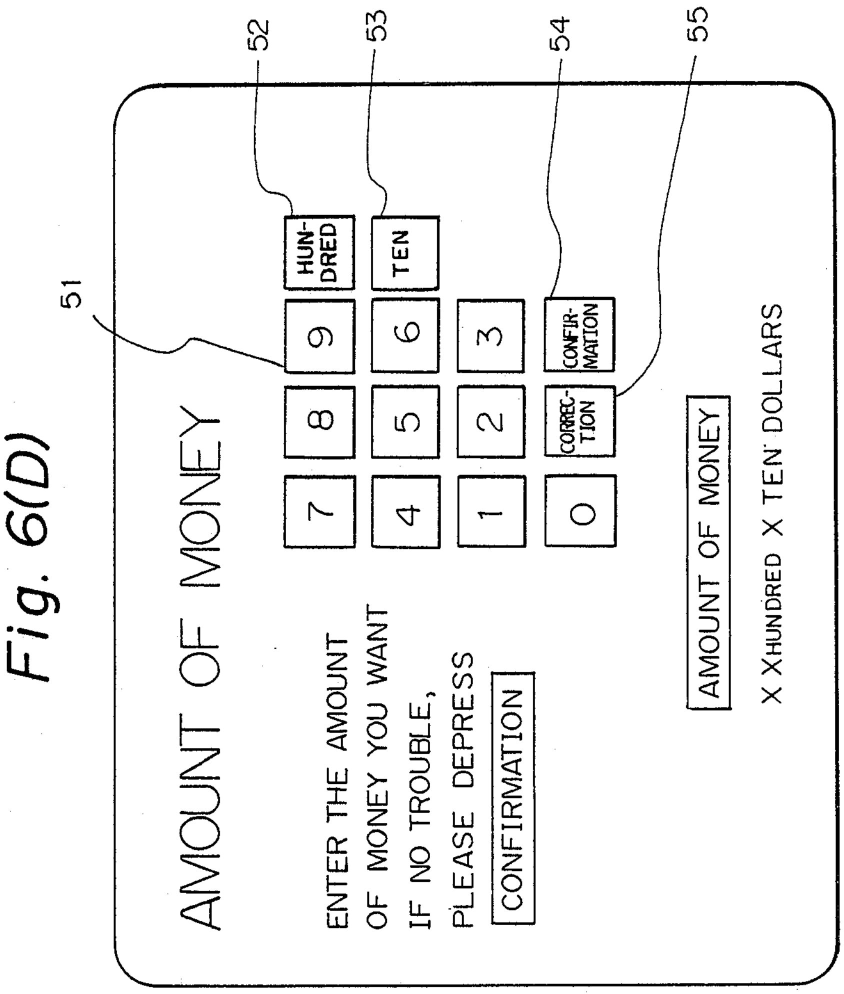
Figure 6E:
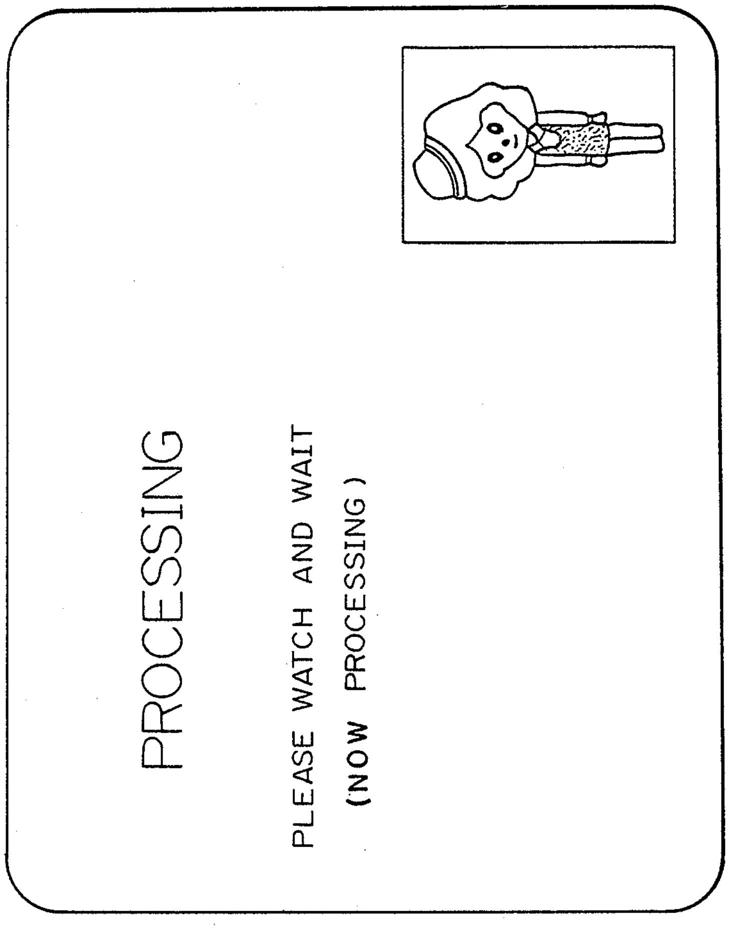
Figure 6F:
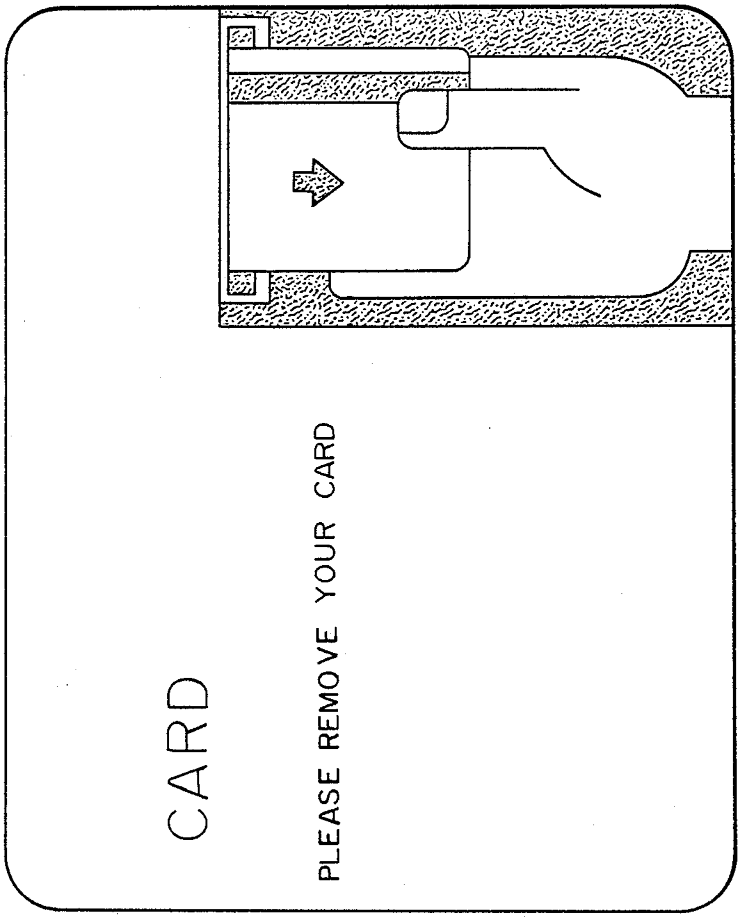

The magnetic card is once read, the main controller 1 instructs the display unit 27 to display the next display, whereby the display controller 5 forces the display unit 27 to display a screen as shown in FIG. 6(C). The screen instructs the customer to key in his identification number and directly exhibits a group of button switches 51 indicative of numerals of from 0 to 9. An identification number is assigned to each customer for assuring the customer, that he is a qualified person for the transaction, and it is kept secret from a third person. The customer enters his identification number by directly touching one of the group of the button switches 51 with his finger while observing the screen (Step 102). The numeral touched with the finger is judged by the main controller 1 on the basis upon a relationship between a touch position signal from the touch input device 28 and a position of each displayed numeral, and is then stored in a memory included in the main controller 1. There is a display on the screen to inform the customer of the number of figures of the identification number entered by the customer, which screen changes its color of a drawn circle every time any numeral of one figure is entered. After all of the figures of the identification number has been entered, the main controller 1 judges whether or not the entered identification is genuine. If it is genuine, the main controller 1 then instructs the display controller 5 to display the next screen, and thereby the screen on the display unit 27 is switched to a screen as shown in FIG. 6(D). The customer designates an amount of money wanted to be drawn out by him by observing the screen while touching the group of button switches 51 and the button switches 52 and 53 indicative of the denomination of the money (Step 103). The amount of the money is displayed on the lower part of the screen. The customer touches a confirmation button switch 54 while observing the display if the amount of the money is proper (Step 104). The customer, if wishes to correct the amount of the money, touches a correction button switch 55. The correction button switch 55 erases the amount of the money displayed on the lower part of the screen of FIG. 6(D) as well as that stored in the memory included in the main controller 1. The main controller 1, once judging an inout indicative of the confirmation described above, instructs the display controller 5 to switch the present screen to the next one, and edits in succession a transmission message including read data from the magnetic card 8 and the amount of money entered and wanted to be drawn out as described above, and transmits it to a host computer provided in a business management center of a bank via the communication interface 6 (Step 105). The host computer refers to the balance of a deposit on customer's account, compares it with an amount of money required to be drawn out by the customer and if the amount can be drawn out, transmits a message indicative of that fact to the automatic transaction apparatus. The main controller 1, upon receiving the message described above via the communication interface 6, transfers the amount of money to be drawn out to the deposit/dispensation controller 3 and instructs the controller 3 to start its dispensing operation. The depositing/dispensing machine 13 counts the designated number of paper currencies from the hundred dollar stacker 14 to the ten dollar stacker 15 and dispenses them (Step 106). These dispensed paper currencies are accumulated internally of the paper currency depositing/dispensing slot 45. While the automatic transaction apparatus conducts the communication processing of the Step 105 and the paper currency count operation of the Step 106, the display unit 27 displays a screen as shown in FIG. 6(E). After completed the counting and dispensing operation of the paper currencies described above, the deposit/dispensation controller 3 transmits a reply signal indicative of the completion of the dispensing operation to the main controller. The main controller 3 then transfers transaction data such as the amount of money to be drawn out and the balance to the card reader/printer controller 2 while it instructs the receipt to be printed. The card reader/printer controller 2, after receiving the instruction described above, operates the dot printer 10, which then prints a record on the present transaction, transfers an embossed character formed on the magnetic card 8 onto a receipt paper or a journal paper 11, and sends the receipt paper 12 to a place to store paper currencies (Step 107). After having received a reply of the completion of printing the transaction record on the receipt paper from the card reader/printer controller 2 by the main controller 1, the controller 1 instructs the record on the magnetic stripe of the magnetic card 8 to be updated as causing well as the card to be discharged, while it instructs the display controller 5 to switch the present screen to the next one. The display controller 5 thereby forces the display unit 27 to display a screen as shown in FIG. 6(F) thereon, while it instructs the customer to receive his card.

Figure 6G:
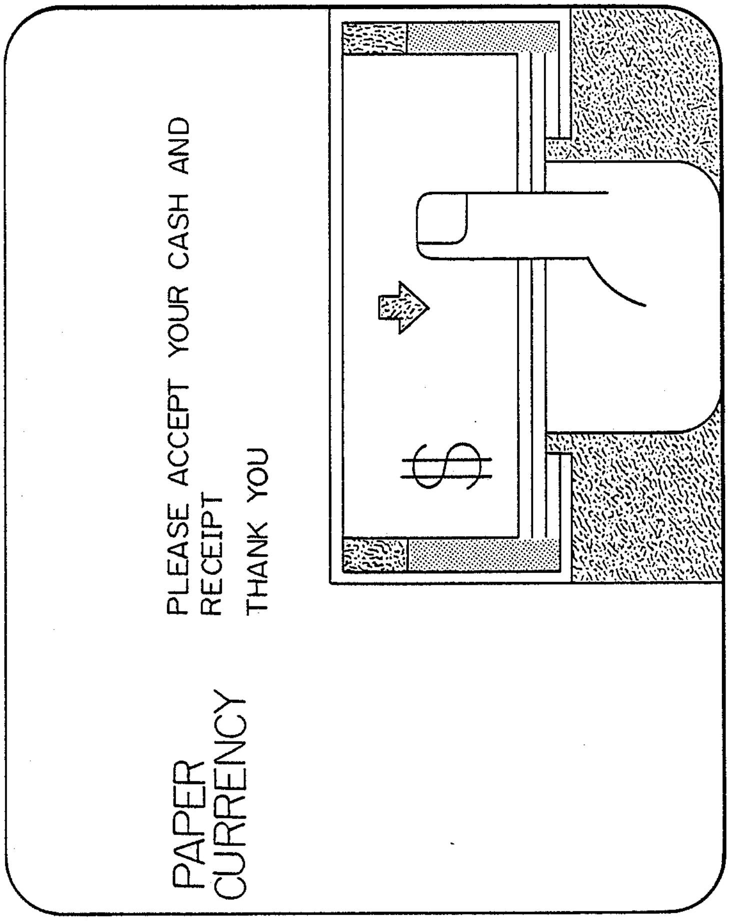

After the magnetic card 8 is pulled out from the card insertion slot 44 by the customer (Step 108), the card reader/writer 9 detects that situation, whereby the card reader/printer controller 8 informs the main controller 1 of that situation. The main controller 1 then instructs the display controller 5 to switch the present screen to the next one. Thus, the display controller 5 drives the display unit 27 to display a screen as shown in FIG. 6(G), and instructs the customer to receive the paper currencies and the receipt while it opens a shutter disposed at the paper currency depositing/dispensing slot 45.

After the paper currencies and the receipt are removed from the depositing/dispensing slot 45 by the customer (Step 109), the depositing/dispensing machine 13 detects that fact and the deposit/dispensation controller 3 informs the main controller 1 of that fact. The main controller then considers the transactions to be completed and instructs the display controller 5 to switch the present screen to the next one. The display controller 5, after receiving that instruction, forces the display unit 27 to display the screen shown in FIG. 6(A) thereon, and hence the automatic transaction apparatus again returns to the state of waiting for a customer.

As described above, an embodiment exemplarily illustrating the procedure of processing the payment transactions by the automatic transaction apparatus according to the present invention was described. According to that embodiment, the user can fufill the transaction by simply touching the screen on the display unit 27 while observing the screen without touching any portion other than the screen upon entering an instruction to the automatic transaction apparatus or entering data such as an amount of money. In addition, the automatic transaction apparatus of the present invention permits the display unit 27 to display as described above, unless the operator key switch 38 is switched on by the operator key 39, only text of instructions and illustrations for guiding the operation of a customer and items selected and designated by a customer, and the apparatus executes only processing for a customer.

When an operator intervenes in processings by the automatic transaction apparatus, he must insert his key 39 into the key slot 47 and turn the key to switch the operator key switch 38 on for informing the automatic transaction apparatus of an operator's request for operation thereof, in the operator operating mode.

The procedures for operating the automatic transaction apparatus in the operator operating mode according to the present invention will be described here with reference to FIGS. 7 and 8.

Figure 7A:
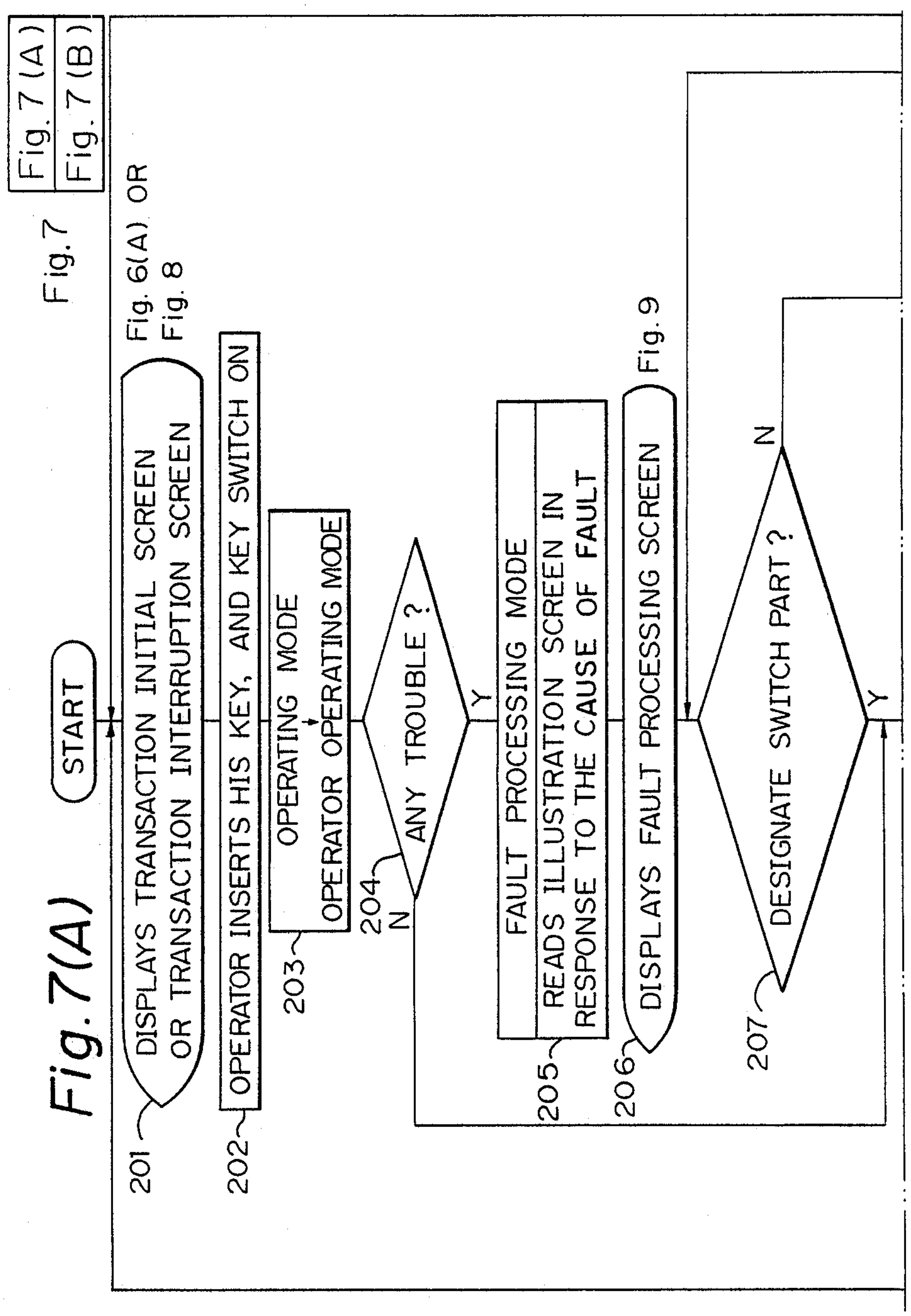
FIG. 7, consisting of FIGS. 7(A)–7(B) is a flowchart illustrating the operation of the embodiment of the present invention in the opeator oprating mode.
Figure 7B:
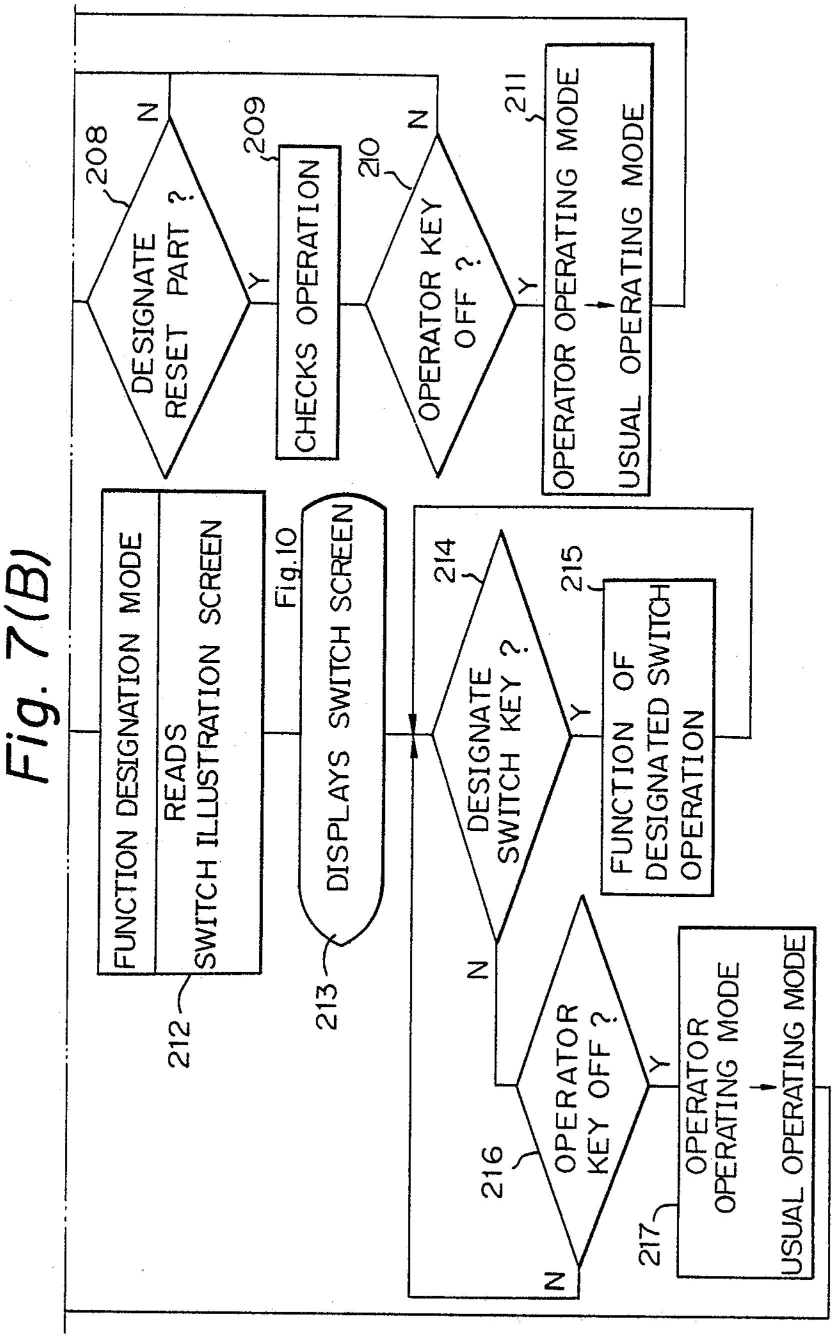
Figure 8:
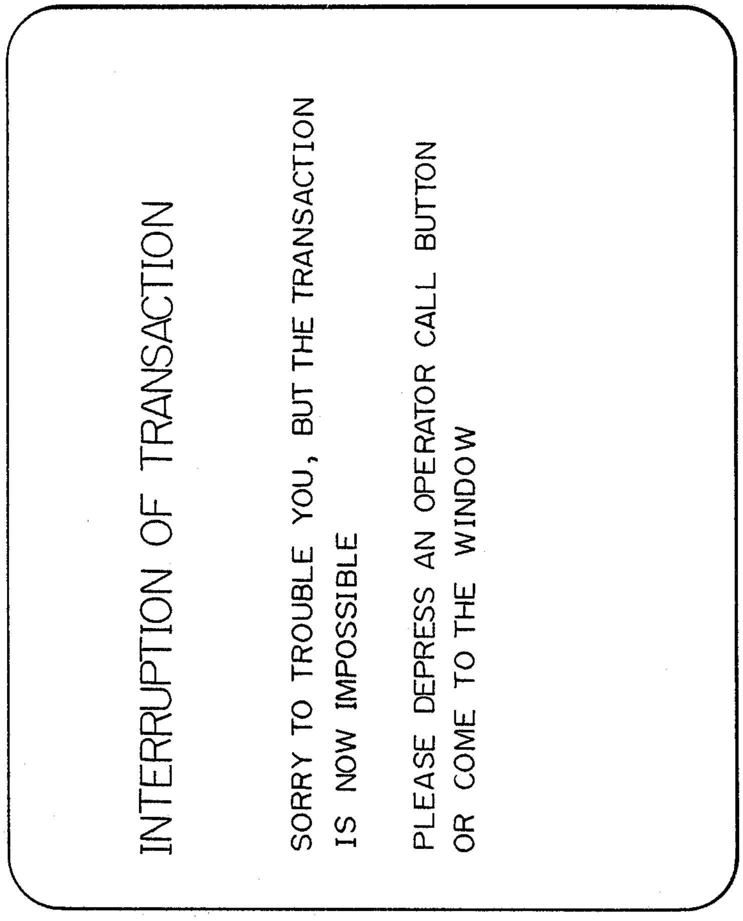
FIG. 8 is an illustration showing a screen on the display of the embodiment of the present invention, the screen being exhibited to a customer when a fault is produced in the apparatus.

Referring to FIG. 7, an automatic transaction apparatus, before being switched to the operator operating mode, permits the display unit 27 to display an initial screen of transactions as shown in FIG. 6(A), while permitting the unit 27 to display, when the apparatus has a trouble and cannot be operated, a screen indicative of the interruption of transactions as shown in FIG. 8 (Step 201). The operator for example, when wanting to interrupt or reopen any processing through the automatic transaction apparatus or when starting to deal with any trouble after the apparatus has the trouble therein, inserts the operator's key 39 into the key slot 47 and turns it for switching the operator key switch 38 on (Step 202). The main controller 1, after detecting that the operator key switch being switched on, switches the automatic transaction apparatus from an operating mode presupposing the operation by a customer described above to the operator operating mode (Step 203). Describing the switching to the operator operating mode with reference to FIGS. 1 and 3, the main controller 1 reads various screen data employed in the operator operating mode from the external memory 7 and transfers it to the display controller 5. The screen data has an illustration part in part and is previously stored in the external memory 7. The display controller 5, once receiving the screen data via the interface 20, incorporates it in the display controller 21 and stores it in the RAM 24. In addition, the display controller 5 is adapted to receive an instruction of switching the operation to the operator operating mode from the main controller 1 and display screen data for the operator operating mode stored in the RAM 24 on the display unit 27.

After finishing the switching from the above operating mode to the operator operating mode, the main controller 1 judges whether or not the automatic transaction apparatus has a trouble (Step 204). Any probable trouble is detected by a fault detecting function provided on the main controller 1 including the card reader/printer controller 2, deposit/dispensation controller 3, and banknote controller 4. With a trouble indication being produced, the main controller 1 is switched to a fault processing mode, and is adapted to instruct the display controller 5 to display a screen in response to the contents of the detected fault as well as a position of the produced fault. The display controller 5 reads screen data of illustration corresponding to the cause of the designated fault from the display unit 27 to display a screen indicative of fault processing as shown in FIG. 9 while displaying the designated fault position in an on-and-off manner or in a color different from the other portions of the display (Step 206).

Figure 9:
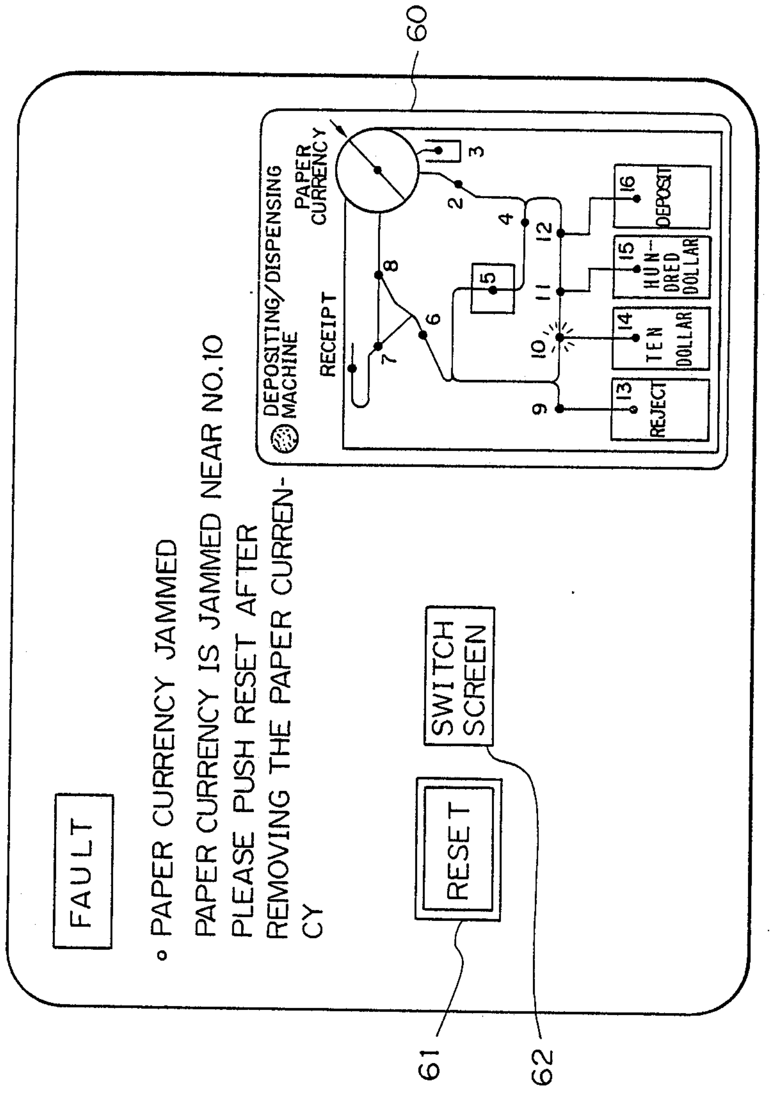
FIG. 9 is an illustration showing a screen on the display of the embodiment of the present invention, the screen being exhibited in the operator operating mode when a fault is produced in the apparatus.

Let us then describe procedures to process a fault produced in the automatic transaction apparatus with reference to FIG. 9 wherein jamming of paper currency is produced in the depositing/dispensing machine 13 is exemplarily shown as a screen indicative of processing the fault. The screen exhibits writings showing a title of the "fault", the contents thereof, and how to process it; an illustration 60 indicative of a position thereof; and the button switches 61 and 62 for "reset" and "switch screen".

The operator confirms the contents of the fault, the causes thereof, and the position thereof while observing the screen indicative of the fault processing and provides a procedure to restore the automatic transaction apparatus. As shown in FIG. 9, the operator opens a front panel of the apparatus, removes the jammed paper currency from a paper currency feed path, and closes the front panel and then touches the "reset" button switch 61. The main controller 1 judges whether a touch position entered from the touch input device 28 is the "reset" button switch 61 or the "switch screen" button switch 62 (Step 207, 208), and if it is the "reset" button switch 61, checks the operations of the same respective portions as those checked in powering the automatic transaction apparatus (Step 209) for eliminating the cause of the fault, and it thus, if the apparatus has been restored, instructs the display controller 5 to erase the fault position being produced. The display controller 5 then stops the display indicative of the fault position arranged in the illustration 60, and informs the operator of the restoration.

After having removed the cause of the fault and restored the apparatus, the operator removes the operator key 39 from the key slot 47. The main controller 1 detects the operator key switch 38 being switched off (Step 210) and returns the operation of the apparatus from the operator operating mode to the operating mode (Step 211). The return operation to the operation mode is effected by allowing the main controller 1 to read the screen data for guiding the operation by a customer as shown in FIGS. 6(A) to (G) from the external memory 7 and transfer it to the display controller 5, and furthermore allowing the display controller 5 to write the screen data in the RAM 24 and to display the transaction initial screen shown in FIG. 6(A) on the display unit 27.

Figure 10:
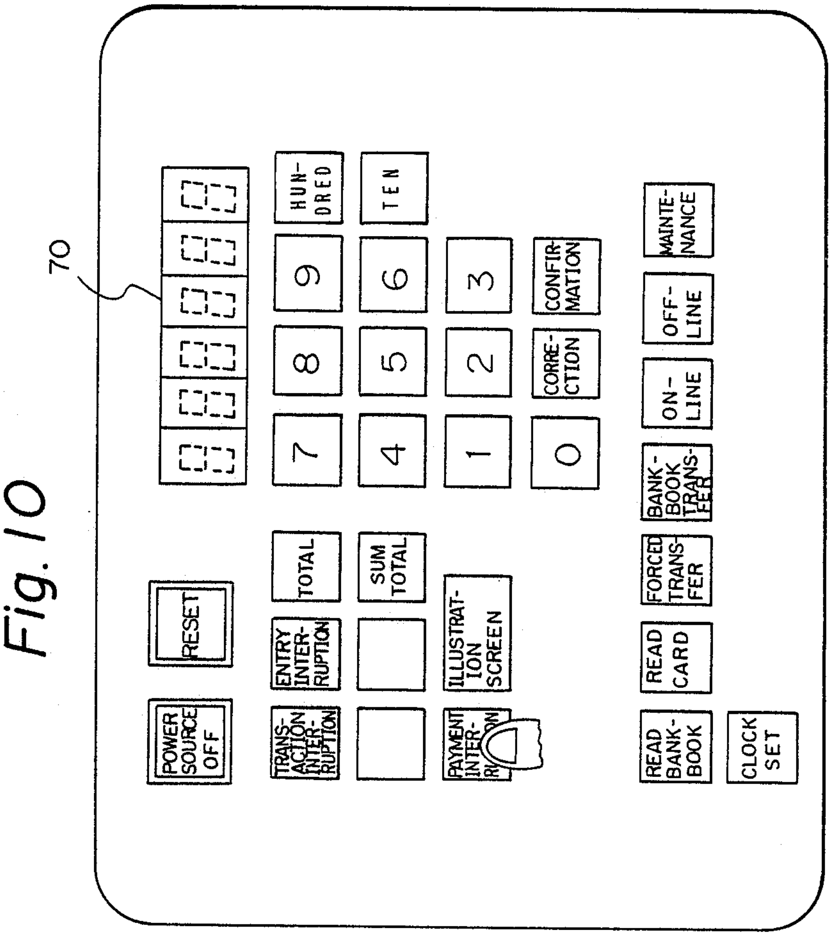
FIG. 10 is an illustration showing a screen on the display of the embodiment of the present invention, the screen being exhibited in a usual operator operating mode.

If the fault is not eliminated, and the transaction is interrupted in part from necessity, or if the automatic transaction apparatus is subjected to various trial operations to eliminate the fault, the operator touches the "switch screen" button switch 62 on the display screen shown in FIG. 9 while keeping the state where the operator key 39 has been inserted into the key slot. After designated the switch screen, the main controller 1 changes to a function designating mode, and it thus reads the switch illustration screen from the external memory 7 and transfers it to the display controller 5 (Step 212). The display controller 5 writes the switch illustration screen data in the RAM 24 and forces the display unit 27 to display the illustration screen indicative of a group of button switches shown in FIG. 10 (Step 213). The switch screen of FIG. 10 is also displayed when the operation is switched in the Step 203 from the operating mode to the operator operating mode, and no fault is judged to be produced in the Step 204. The screen exhibits a button switch arranged in the same manner as in an internal operating board provided inside the apparatus up to now and operated by an operator, the button switch requesting then a specific function of the automatic transaction apparatus. The touch input device 28 can detect, even if many kinds of and a plurality of button switches are displayed on the screen of the display unit 27 in such a manner, which button switch is depressed through the tough input device 28. In addition, positions of displaying the button switches described above are, if arranged within a range where they are detectable by the touch input device 28, and not limited in particular. A display portion 70 is also provided on the screen shown in FIG. 10, which displays, besides these button switches, an error code employed as any error is produced in the automatic transaction apparatus and any numeral entered by the keys. Although titles of the respective button switches, functions thereof, and applications thereof shown in FIG. 10 are as follows, the operator, irrespective of such many button switches being disposed, can provide designation of depressing any necessary button by directly touching a display position corresponding to the above button while observing the display screen, and thus a mistaken operation such as another button switch being designated by mistake can be eliminated.

TABLE 1

Functions and Applications of Respective button switches

| Designation | Functions and Applications |
|---|---|
| Reset | Employed upon restoring an abnormal state of the apparatus |
| Clock set | Employed upon setting date and time |
| Subtotal | Prints a count on a receipt |
| Total | Prints a count on a receipt and clears a counter after the printing |
| | Employed by setting an auditing key. |
| Service Stop | Employed when it is necessary for the automatic transaction apparatus is to stop its service |
| Deposit Stop | Employed when stopping the processing of deposit transactions |
| Payment Stop | Employed when stopping the processing of payment transactions |
| Entry Stop | Employed when stopping the processing of banknote transaction |
| Transfer and Account Stop | Employed when stopping the processing of transfer banknote transactions |
| Illustration Screen | Employed for switching an illustration to a fault processing screen |
| Maintenance | Exclusive for personnel necessary for maintenance |
| Off-Line | Employed when operating the apparatus in the off-line mode |
| On-Line | Employed when employing the apparatus in the on-line mode |
| Bankbook | Employed when carrying forward the present |

TABLE 1-continued

Functions and Applications of Respective button switches

| Designation | Functions and Applications |
|---|---|
| Carry-over | bankbook to a new one |
| Forced Carry-over | Employed when forcedly carrying from present bankbook to a new one |
| Card Read | Employed when examining a magnetic state of a card |
| | Employed by setting an inspection key. |
| Bankbook Read | Employed when examining a bankbook magnetic stripe |
| Power Source Off | Employed when interrupting power supply to the automatic transaction apparatus |
| Numeric Key | Employed when setting slating, time and the number of loaded paper currencies to be payed |
| Correction | Employed when correcting the contents inputted by a key |
| Confirmation | Employed when finishing input operation from a numeric key |
| Hundred | Employed when designating the number of loaded hundred dollar |
| Ten | Employed when designating the number of loaded ten dollar |

Once an operator touches any button switch within the screen, the touch input device 28 informs the main controller of a touched position. The main controller 1 judges which button switch is designated on the basis of the present display screen of the display unit 27 and the above touched position data (step 214) and forces the designated button to fulfill the function described above corresponding to that button (Step 215).

When an operator completes a prescribed operation and removes the operator's key 39 to switch the operator key switch 38 off (Step 216), the main controller 1 is switched to the mode (Step 217), and, if having restored from the transaction initial screen or a fault displays a transaction interruption screen on the display device 27. Another example of the fault processing will be described here with reference to FIGS. 11(A) and 11(B).

Figure 11A:
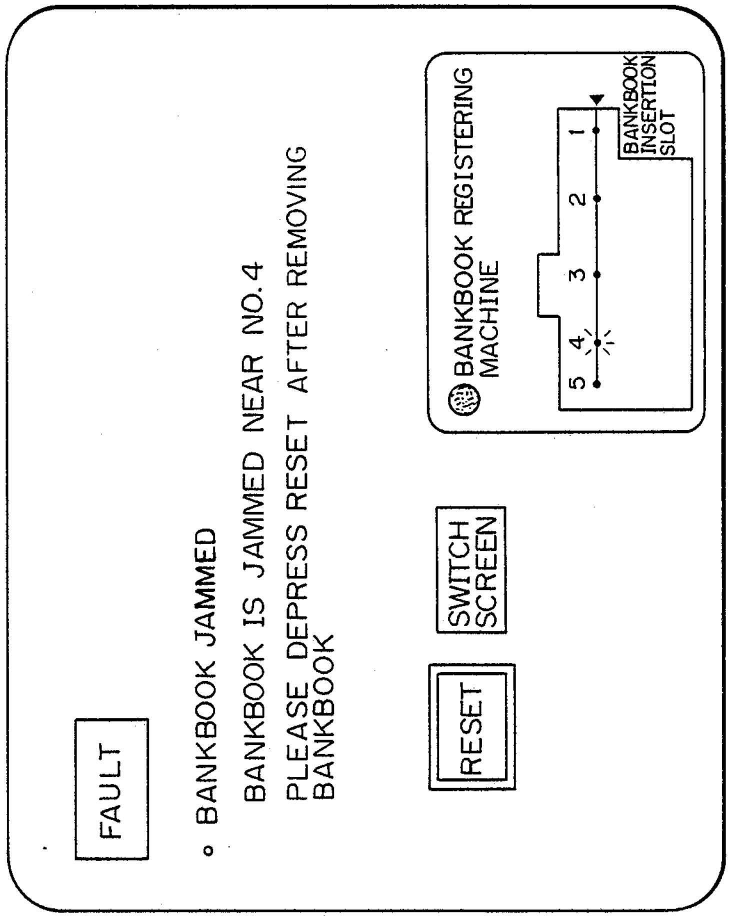
FIGS. 11(A) and (B) are illustrations showing other screens on the display of the embodiment of the present invention, the screens being exhibited in the operator operating mode when a fault is produced in the apparatus.
Figure 11B:
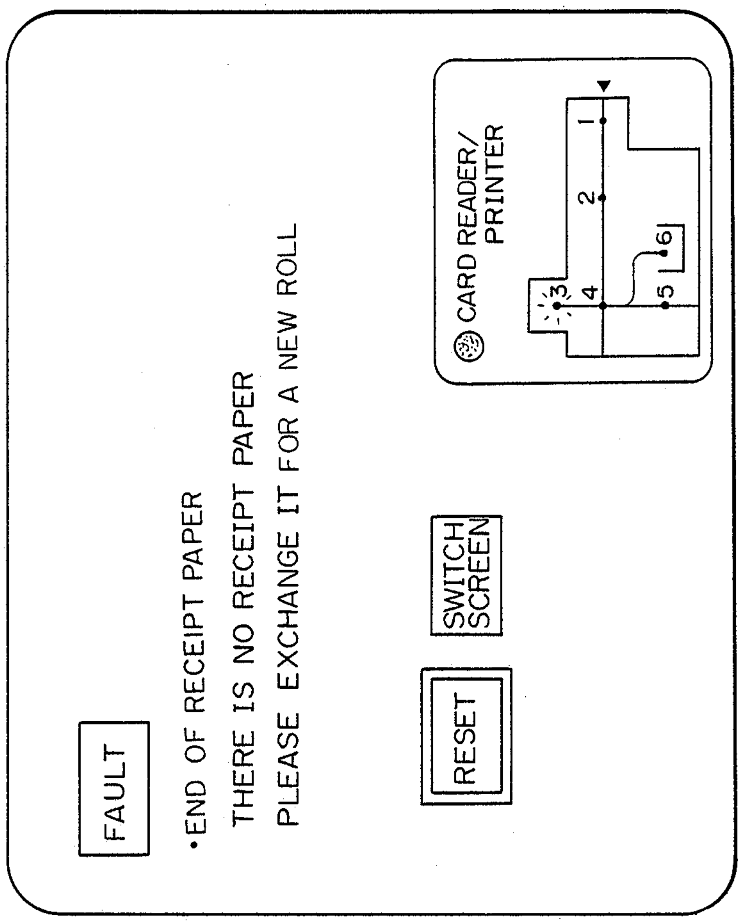

FIG. 11(A) shows a fault when a bankbook is jammed in the middle of a feed path of the bankbook registering machine 17, and FIGS. 11(B) shows a fault when a receipt paper in the card reader/printer is exhausted together with an illustration illustrating a fault position. For the bankbook registering machine, a writing of one kind indicative of the contents of any fault may be employed since the cause of the fault is merely clogging through a bankbook. However, for the card reader/-printer, since there may be a fault due to jamming of a card and a receipt too, a plurality of text of the contents of the fault are prepared for an illustration shown in FIG. 11(B).

In addition, depending on the contents of faults there are those difficult to be illustrated, so, although all the fault processing screens are not necessarily displayed with illustrations, fault processing screens capable of displaying the following contents of faults and text to process them are prepared.

There is a card jammed in the vicinity of No. (for example ) 4. Please depress the Reset after removing it.

There is a receipt jammed in the vicinity of No. (for example) 4. Please depress the Reset after removing it.

There is a bankbook jammed in the vicinity of No. (for example) 4. Please depress the Reset after removing it.

There is a paper currency jammed in the vicinity of No. (for example) 4. Please depress the Reset after removing it.

There is a coin jammed in the vicinity of an address of No. (for example) 4. Please depress the Reset after removing it.

A door is open. Please close it.

The apparatus has not been set in place. Please Reset it properly.

The cashbox of No. (for example) 4 has been filled up. Please withdraw some cash.

There is no cash in the cashbox of No. (for example) 4. Please replenish it with some money.

There is no receipt paper. Please exchange it for a new roll.

It is impossible to confirm transactions. Please contact the center.

The transaction fell through. Please call service personnel.

The present invention is not limited only to the embodiment described above, but various modifications may be made therein. For example, to switch the operation to the operator operating mode, a magnetic card for the operator's exclusive use may be employed instead of the operator key 39. Thereupon, the magnetic card saving specific information stored therein is inserted into the card reader/writer 9 in the same manner as that of a customer and is read, and thereafter the read information is transferred to the main controller 1. The main controller 1 identifies specific information thereamong to switch the operation to the operator operating mode. However, the method using the magnetic card can not be employed when a fault is produced in the card reader/writer 9. To avoid this, it is of course possible to provide a magnetic card reader for the operator's exclusive use. In addition, for the display unit 27, in place of a CRT, a liquid crystal display or plasma display panel may be employed. As described above, it is obvious that the objects of the present invention can be achieved with the embodiment thereof. Furthermore, the above description is given to illustrate the present invention without limiting the spirit of the present invention.

Although a certain preferred embodiment has been shown and described, it should be understood that many changes and modifications may be made therein without departing from the scope of the apended claims.

What is claimed is:

1. An automatic transaction apparatus for displaying a user operating procedure to be performed by a user and items to be selected or specified by the user to enable the user to implement transaction processes, and for displaying a picture for an operator to enable the operator to implement the setting and changing of functions when operator operation is requested, the automatic transaction apparatus comprising:

a CRT display provided in a user operating unit;

a transparent tough input unit provided on a screen of said CRT display, for allowing the viewing of said screen of said CRT display therethrough, and for entering an item when said screen is touched at a position on said screen where an indication representing the item is displayed;

an operator operation request notifying means;

an operator operation request detecting means;

a mode switching means for switching an operating mode of the apparatus from a practical operation mode to an operator operation mode upon the detection of an operator operation request by said operator operation request detecting means;

a decision means for determining whether or not there is any trouble in the automatic transaction apparatus in the operator operation mode;

a mode setting means for placing the automatic transaction apparatus in a trouble eliminating mode when trouble is found in the operator operation mode, and for placing the automatic transaction apparatus in a function designating mode when no trouble is found in the operator operation mode;

a storage means for storing display data to be displayed on the screen of said CRT display in both said trouble eliminating mode and said function designating mode;

a display control means for controlling operations for editing display data, holding display data and feeding display data to said CRT display; and a transfer means for reading display data corresponding to said trouble eliminating mode or said function designating mode or said function designating mode from said storage means and for transferring display data to said CRT display when the automatic transaction apparatus is in said trouble eliminating mode or said function designating mode.

2. An automatic transaction apparatus according to claim 1, wherein said display data for said trouble eliminating mode includes the causes of troubles and messages of guidance to deal with such troubles.

3. An automatic transaction apparatus according to claim 1, wherein said display data for said trouble eliminating mode includes an illustration showing a position where trouble has occurred.

4. An automatic transaction apparatus according to claim 1, wherein said display data for said trouble eliminating mode includes display data representing a key for entering an instruction to change from said trouble eliminating mode to said function designating mode.

5. An automatic transaction apparatus according to claim 1, wherein a picture displayed on said CRT display in said function designation mode includes display data of a switch picture illustrating a group of keys for designating the setting and changing of the functions of the automatic transaction apparatus.

6. An automatic transaction apparatus according to claim 5, wherein said switch picture includes an illustration of a key for designating an interruption of transaction.

7. An automatic transaction apparatus according to claim 5, wherein said switch picture includes an illustration of a key for designating a restoration of the automatic transaction apparatus from an abnormal condition.

8. An automatic transaction apparatus according to claim 5, wherein said switch picture includes an illustration of numerical keys respectively indicating numerals 0 through 9.

9. An automatic transaction apparatus according to claim 1, wherein said operator operation request means is a key.

10. An automatic transaction apparatus according to claim 1, wherein said operator operation request means is a card.

* * * * *